(No Model.)
J. YOUNG & N. GREEN.
MACHINE FOR CUTTING STRING BEANS.
No. 363,785. Patented May 24, 1887.
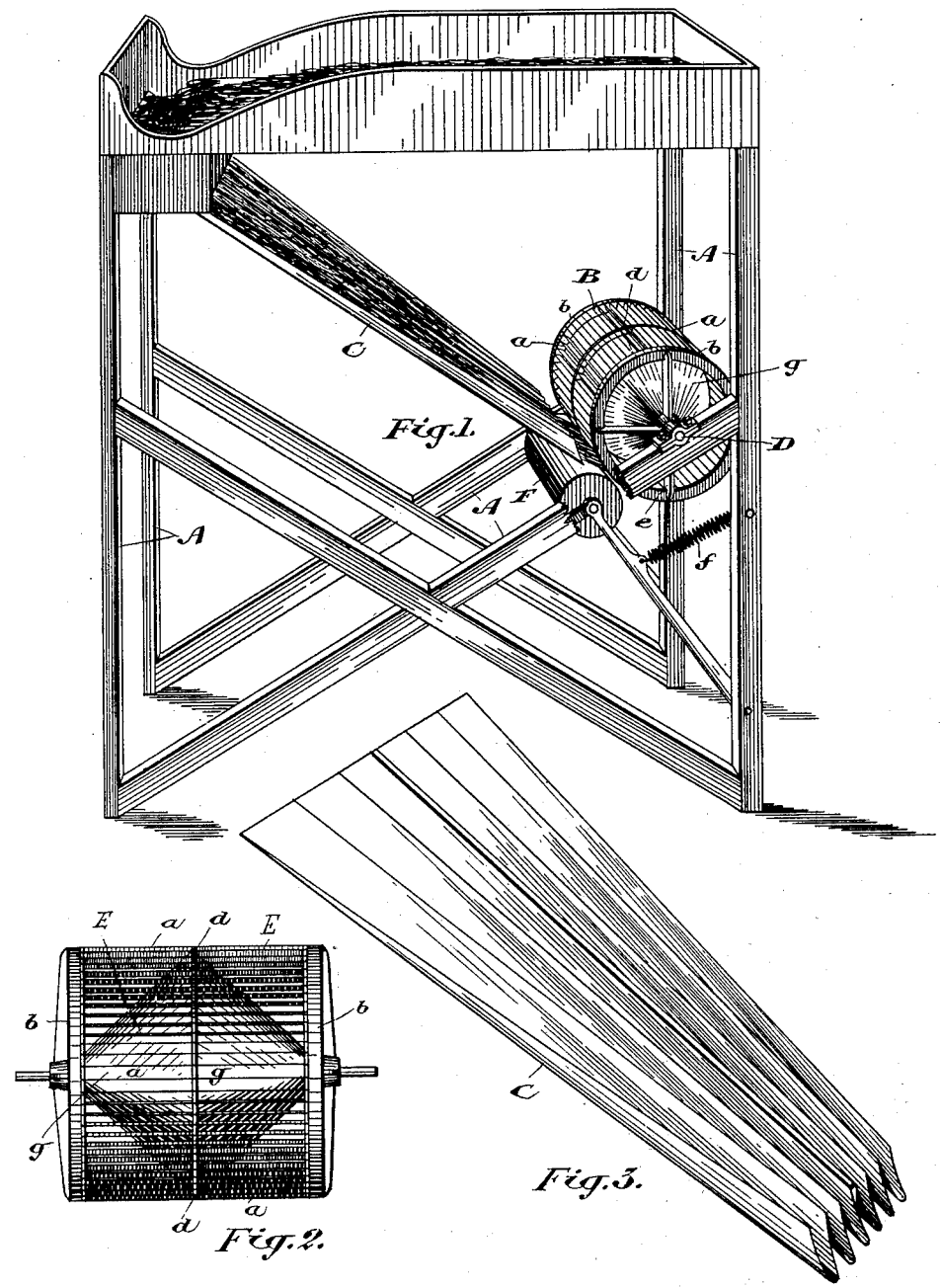
WITNESSES.
F. B. Fetherstonhaugh
J. M. Jackson
INVENTORS.
Joshua Young
Nelson Green
by Donald C. Ridout & Co
ATTORNEYS.

UNITED STATES PATENT OFFICE.

JOSHUA YOUNG AND NELSON GREEN, OF WATERFORD, ONTARIO, CANADA.

MACHINE FOR CUTTING STRING-BEANS.

SPECIFICATION forming part of Letters Patent No. 363,785, dated May 24, 1887.

Application filed November 11, 1886. Serial No. 218,603. (No model.)

*To all whom it may concern:*

Be it known that we, JOSHUA YOUNG and NELSON GREEN, both manufacturers, and both of the village of Waterford, in the county of Norfolk, in the Province of Ontario, Canada, have jointly invented certain new and useful Improvements in Machines for Cutting String or Green Beans, of which the following is a specification.

The object of the invention is to construct a machine in which string or green beans may be cut into uniform lengths; and it consists in the peculiar combinations and the novel construction, arrangement, and adaptation of parts, all as more fully hereinafter described and claimed.

Figure 1 is a perspective view of our bean-cutter. Fig. 2 is a detail of the cutting-cylinder. Fig. 3 is a detail of the conveying-chutes.

In the drawings, A represents the main frame of the machine, which may be made of any suitable design, so long as it will support properly the cutting-cylinder B and conveying-chutes C.

The cutting-cylinder B consists of a series of knives, a, connected to the cylinder ends b, and preferably braced in their center by the ring or disk d. The cylinder ends b are open, the bearings being supported from the shaft D by radiating arms e. On each side of the center disk, d, we form a cone, E. The base of each commences at a point near the bottom of the knives, and its apex at or near the inside of the arms of the cylinder ends, so that beans falling between the knives a are directed by the cones E to the open ends of the cylinder B, and thereby secure a free discharge. A roller, F, is carried in suitable bearings on the frame A, and is held against the knives a by the action of suitable springs, f, which springs are designed of sufficient strength to hold the roller F against the knives a, but without interfering with the free revolving motion of the cylinder.

c are the bean-chutes, preferably set at such an angle that the beans will slide down in them freely toward the cylinder B, where the bottom ends of the chutes c are set.

In the drawings we show six chutes, but of course we do not confine ourselves to any particular number. Each chute is preferably made U or V shape, its upper end being also made preferably wider than the bottom end next to the cylinder B. This form of chute tends to straighten the string-beans, which are thrown into the machine at the top end of the chutes c, so that by the time they reach the bottom of the chutes c they are all presented longitudinally to the cutting-knives a. The cylinder B, which is caused to revolve at a high speed, brings the knives a in rapid succession against the roller F, drawing the beans between the knives and the roller and cutting them into the required lengths.

What we claim as our invention is—

1. In a string or green bean cutting machine, a plurality of inclined chutes to direct the beans toward the cutting-knives, in combination with a series of knives carried on a revolving cylinder having a cone to direct the cut beans arranged at right angles to said chutes and above the discharge end thereof, substantially as and for the purpose specified.

2. In a string or green bean cutting machine, a revolving cylinder provided with a series of knives, in combination with cones within said cylinder with their bases adjacent to each other, substantially as and for the purpose specified.

3. The combination, with the frame and the inclined chutes, of the rotary cylinder journaled in said frame above the discharge end of said chutes, knives carried by said cylinder, and a spring-pressed roller arranged beneath the discharge end of said chutes and against which said knives operate, substantially as described.

4. The combination, with the cylinder B, having open ends b, radiating arms e, shaft D, and knives a, secured to said ends, of the cones E within said cylinder with their bases adjacent, and the center disk, d, bracing said knives at the base of the cones, substantially as described.

Signed at Waterford this 25th day of October, 1886.

JOSHUA YOUNG.
NELSON GREEN.

In presence of—
GLENN GREEN,
WILLIAM LEE.